Nov. 8, 1932.　　　L. D. SLOCUM　　　1,886,432
FARM IMPLEMENT
Filed July 15, 1929　　3 Sheets-Sheet 1
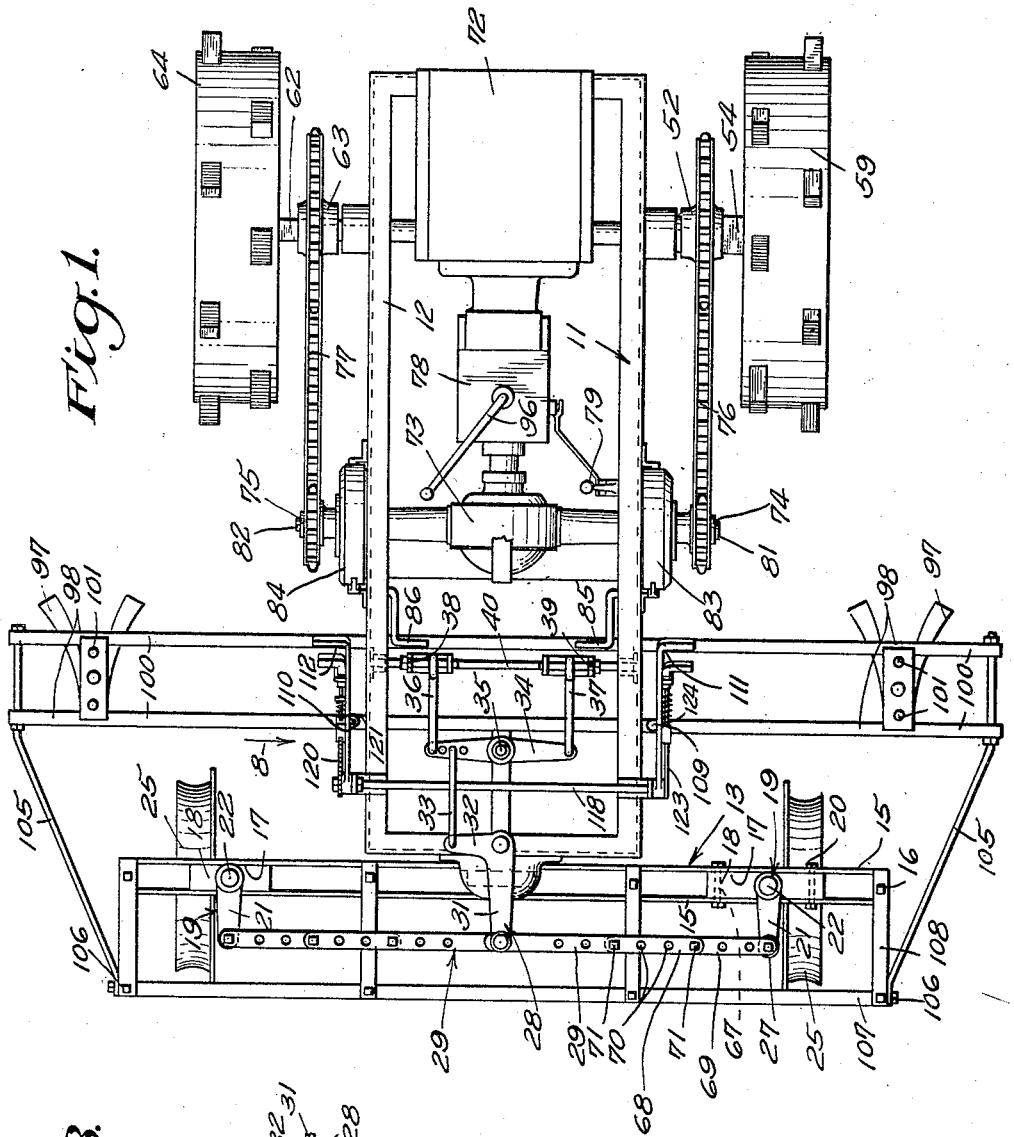
Fig.1.
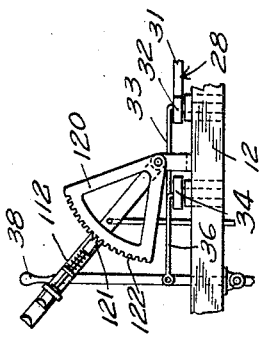
Fig.8.
INVENTOR:
LESLIE D SLOCUM,
By
ATTORNEY.

Nov. 8, 1932.   L. D. SLOCUM   1,886,432
FARM IMPLEMENT
Filed July 15, 1929   3 Sheets-Sheet 2

INVENTOR:
LESLIE D. SLOCUM,
By
ATTORNEY.

Nov. 8, 1932.   L. D. SLOCUM   1,886,432
FARM IMPLEMENT
Filed July 15, 1929   3 Sheets-Sheet 3
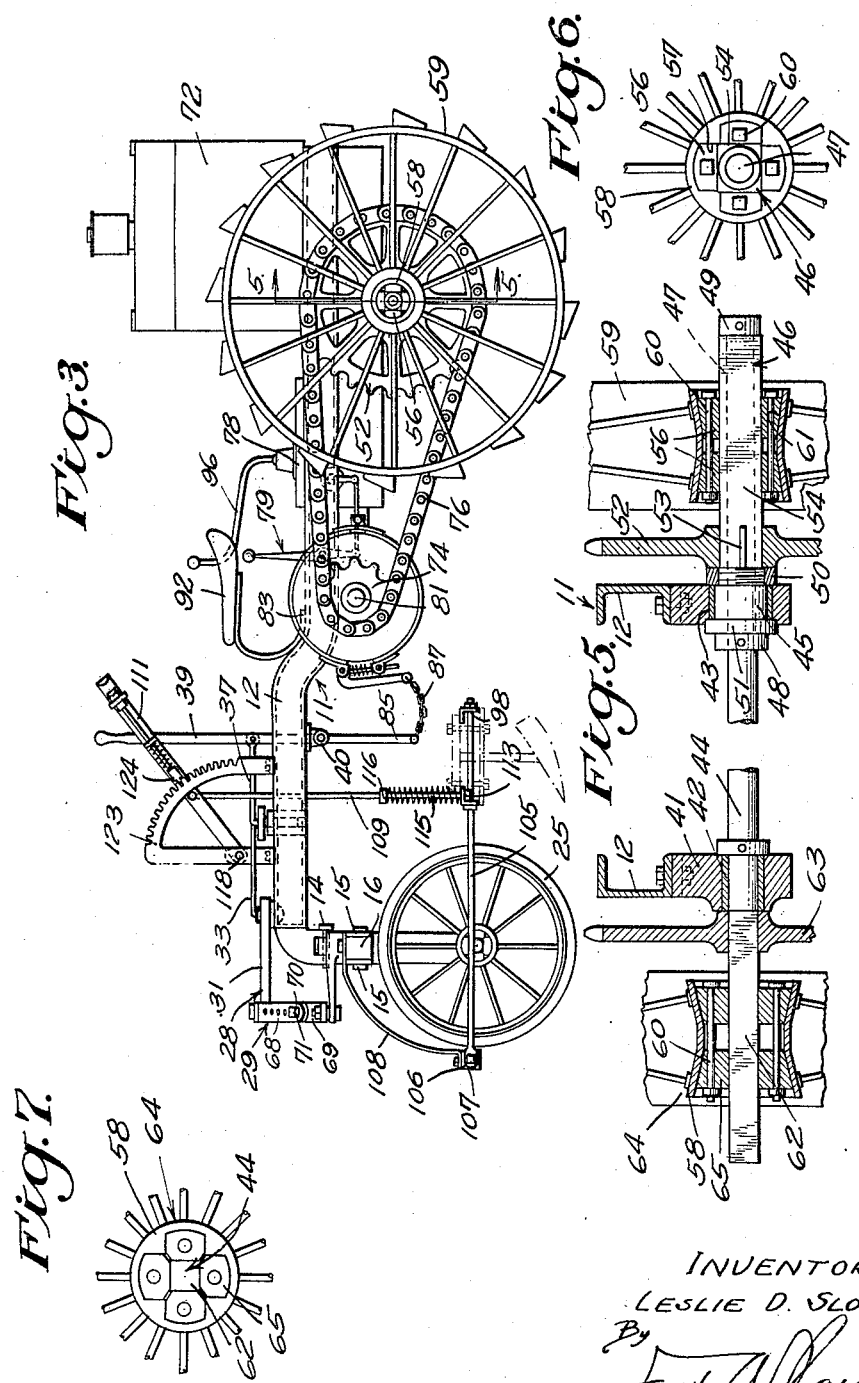
INVENTOR:
LESLIE D. SLOCUM,
By
ATTORNEY.

Patented Nov. 8, 1932

1,886,432

UNITED STATES PATENT OFFICE

LESLIE D. SLOCUM, OF OXNARD, CALIFORNIA

FARM IMPLEMENT

Application filed July 15, 1929. Serial No. 378,343.

This invention relates to automotive farming equipment and relates particularly to a light tractor device having such variety of utilities as to replace the use of animals in farm work.

At the present time heavy farm work, such as plowing, disking, harrowing, etc., is done by the use of gasoline driven tractors, but for certain crops it is still necessary to use farm animals for the lighter work, such as planting, cultivating, and cutting, owing to the fact that the heavy tractors required for the heavy work previously mentioned are not suitable for this light work. As examples of crops which require farm animals for the light work, beets and beans may be cited. Either of these are planted in evenly spaced rows and require what is termed close cultivation, or in other words, the keeping of the ground in well broken condition close to the plants.

There are a number of reasons why the present tractor equipment is not suitable for the light work connected with crops of the above character which are planted in rows and require careful cultivation. These reasons are in contravention to and will become apparent from the following stated objects of my present invention.

It is an object of the invention to provide an automotive farm implement in the form of a vehicle having front wheels and back wheels adapted to be set at distances apart to correspond to the spacing of the rows in which the crops are planted and to provide at all times complete visibility of the rows of plants from the driver's seat on the implement.

It is an object of the invention to provide an automotive farm implement having an adjustable tool carrier or tool holding frame at the forward end thereof and to steer the vehicle by swinging the front wheels thereof, thus making it possible for the driver or operator to cause the tools or implements to closely follow the rows by reason of the fact that the implements or tools are held by the carrier in close proximity to the front wheels of the device.

A further object of the invention is to provide a novel form of adjustment means for controlling the position of the tool carrier relative to the soil and to enable the driver to raise or lower the tool carrier without leaving the driver's seat of the vehicle.

A further object of the invention is to provide a vehicle which may be turned on a very short radius and which has a steering device easily operated by the driver, thus enabling him to closely follow the rows without extremely fatiguing labor.

A further object of the invention is to provide an automotive farm vehicle of the above character having a steering apparatus so designed that it may be readily operated by any person who is able to drive a farm animal, thereby substantially eliminating any requirement for special training in the handling of the vehicle.

A further object of the invention is to provide in a vehicle a means for assisting in the turning thereof and causing the vehicle to turn on a very short radius, this means including a brake for the right-hand rear wheel and a brake for the left-hand rear wheel of the vehicle, with means operative in consequence of the steering of the vehicle to the right or to the left to retard respectively the right-hand rear wheel or the left-hand rear wheel, thereby causing the vehicle to swing in a pivoting manner on whichever of the rear wheels is retarded.

Further valuable and important objects of the invention and valuable objects relative to novel details of construction will be evident from the following part of the specification.

Referring to the drawings which are for illustrative purposes only,

Fig. 1 is a plan view showing in simple and diagrammatic form an automotive farm implement or vehicle embodying my invention.

Fig. 3 is a right-hand elevation of the farm vehicle.

Fig. 5 is an enlarged fragmentary section as indicated by the line 5—5 of Fig. 3, showing the manner of independently maintaining and driving the rear wheels of the vehicle.

Fig. 6 is a fragmentary elevational view looking at the right of Fig. 5.

Fig. 7 is a fragmentary elevational view looking at the left of Fig. 5.

Fig. 8 is a fragmentary elevational view looking in the directon of the arrow 8 of Fig. 1, for illustrating the right-hand vertical adjustment member of the tool carrier.

Figure 2:
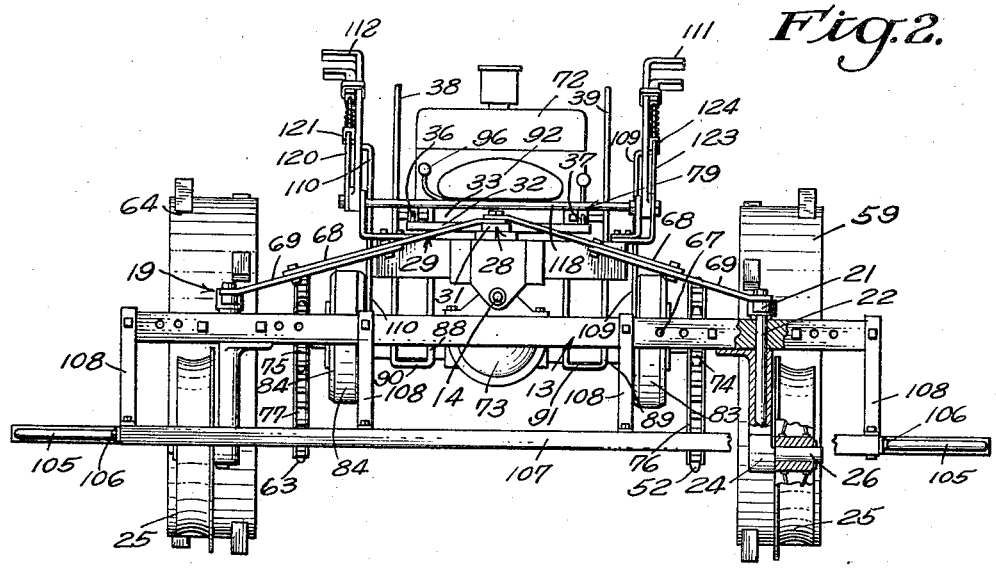
Fig. 2 is a front elevation thereof.

The illustrated simple form of device embodying my invention includes a frame structure 11 which consists of a primary frame 12 and a secondary frame 13 which is flexibly attached to the primary frame 12 by means of a pin 14, indicated in Fig. 2, which pin 14 extends horizontally in longitudinal direction, thus allowing the primary and secondary frames 12 and 13 to swing relatively to each other in vertical planes, this being for the purpose of compensating for the unevenness of the ground over which the vehicle is driven. The secondary frame 13 includes a pair of lateral bars 15 which are spaced apart by means of blocks 16 so as to provide lateral channels 17 at the ends thereof in which blocks 18 of steering knuckles 19 are clamped by means such as bolts 20 which extend through the bars 15 and the blocks 18. The steering knuckles 19 include upper levers 21 situated at the upper ends of vertical shafts or pins 22 which extend through suitable bearing means provided by the blocks 18 and have axle fittings 24 secured to their lower ends so that front wheels 25 may be supported in a laterally swingable manner on stub shafts 26 which project laterally from the axle fittings 24. Outer ends 27 of the levers 21 are connected to a central lever 28 by means of adjustable links 29.

The central lever 28 forms part of a crank 31 having a laterally extending arm 32 which is connected by a link 33 to a centrally pivoted cross bar 34 carried by a vertical pin 35 on the primary frame 12. From the ends of the cross bar 34 links 36 and 37 extend to steering levers 38 and 39 which are swingably supported on a laterally extending horizontal shaft 40, as indicated in Fig. 3.

As shown in detail in Fig. 5, by means of blocks 41 projecting downwardly from the rearward portion of the primary frame 12, bearings 42 and 43 are supported. In the rightward bearing 42 a shaft 44 is turnably supported. This shaft also projects axially through the bearing 43 in which the bearing portion 45 of a tubular member 46 is received. The tubular member 46 is bored to receive the rightward end 47 of the shaft 44 and is turnably held upon the rightward end 47 between collars 48 and 49. A ring nut 50 operates in conjunction with a flange 51 at the inner end of the tubular member 46 to position the tubular member 46 relative to the left-hand bearing 43. Adjacent to the ring nut 50 a sprocket 52 is mounted on the tubular member 46 and is adapted to be driven through a key 53. The outer portion of the tubular member 46 is squared, as indicated at 54, so as to provide flat external faces to receive the inner faces of wedge blocks 56 which are received in four channels 57 disposed in circular relationship within the hub 58 of the leftward rear wheel 59 of the vehicle.

The pairs of wedge blocks 56, when forced inwardly by bolts or equivalent screw means 60, are clamped tightly against the squared portion 54 of the tubular member 46 by reason of being forced inwardly by inwardly converging faces 61, Fig. 5, of the channels 57 in which the wedge blocks 56 are received. By means of this positively acting wedge attachment means I am enabled to clamp the wheel 59 in any desired position on the squared portion 54 of the tubular member or cannon bearing 46.

The rightward end 62 of the shaft 44 is squared, as indicated, and this squared portion 62 supports a sprocket 63 through which the shaft 44 may be rotated from the power source to be hereinafter described. A rightward drive wheel 64 identical with the drive wheel 59 and having a hub 58 identical with the hub of the wheel 59 is secured upon the squared portion 62 of the shaft 44 by means of wedge blocks 65 which are of the same width as the wedge blocks 56, but are of greater height to compensate for the smaller size of the squared portion 62 on which the wheel 64 is mounted as compared with the size of the squared portion 54 of the tubular member 46. The pairs of wedge blocks 65 are drawn inwardly by bolts 60 so that the same character of clamping action as that described relative to the attaching of the leftward drive wheel 59 is thereby attained.

A feature of the invention is to provide adjustability of the spacing of the front wheels and the rear wheels so that the wheels may be set to a gauge or spacing corresponding to the separation or spacing of the rows of plants between which the vehicle is driven in its operation. As made evident in the preceding description, the rear or drive wheels 59 and 64 may be moved laterally on the respective members 46 and 44 to give a desired separation or spacing and may be tightly clamped in such position by the means specified. For purpose of permitting adjustability of the spacing of the front wheels 25, a series of bolt holes 67, Fig. 2, is provided in the lateral bars 15 of the secondary frame 13.

To change the spacing of the front wheels, the bolts 20 are removed and the blocks 18 of the steering knuckles 19 are moved into positions relative to a desired set of bolt holes 67, and the bolts 20 are then replaced, thus clamping the steering knuckles 19 in their new positions of operation. The links 29 are made in such a manner that they may be lengthened or shortened in conformity with the change in position of the steering knuckles 19. For this purpose each of the links 29 is made of two flat bars 68 and 69 having cooperating holes 70 through which bolts 71 may be passed.

At the rearward end of the primary frame 12 a power means 72, which is preferably an enclosed gas engine, is located, and is adapted to drive the rear wheels 59 and 64 through a differential transmission 73, sprockets 74 and 75, and chains 76 and 77 which extend respectively over the sprockets 52 and 63. Between the source of power 72 and the differential 73 a transmission element 78 is located, this transmission element including a clutch operated by a link and lever arrangement 79. The differential 73 includes, within the gear casing shown, standard differential gear parts through which are driven shafts 81 and 82 on which the sprockets 74 and 75 are rotated. Through the differential 73 the drive wheels 59 and 64 are independently driven and may rotate at different relative speeds, as is necessary when the vehicle is turned.

On the shaft 81 a brake mechanism 83 is situated and has the purpose of serving as a retarding means for the leftward rear wheel 59. A similar brake mechanism 84 is mounted on the shaft 82 and is adapted to function as a retarding means for the rightward rear wheel 64. For operation of the brake mechanisms 83 and 84 foot pedals 85 and 86 are provided, and in addition thereto chains or links 87 are extended respectively to the lower ends of the steering levers 38 and 39, as clearly shown in the diagrammatic perspective view, Fig. 4.

It will be perceived that the point of pivot defined by the shaft 40 is situated at an intermediate point so that when the levers 38 and 39 are swung in one direction lower ends 88 and 89 thereof will swing in the opposite direction. The lower ends 88 and 89 are each provided with a stirrup as respectively indicated at 90 and 91 to receive the feet of the driver who occupies a driver's seat 92 situated substantially in the center of the primary frame 12.

Figure 4:
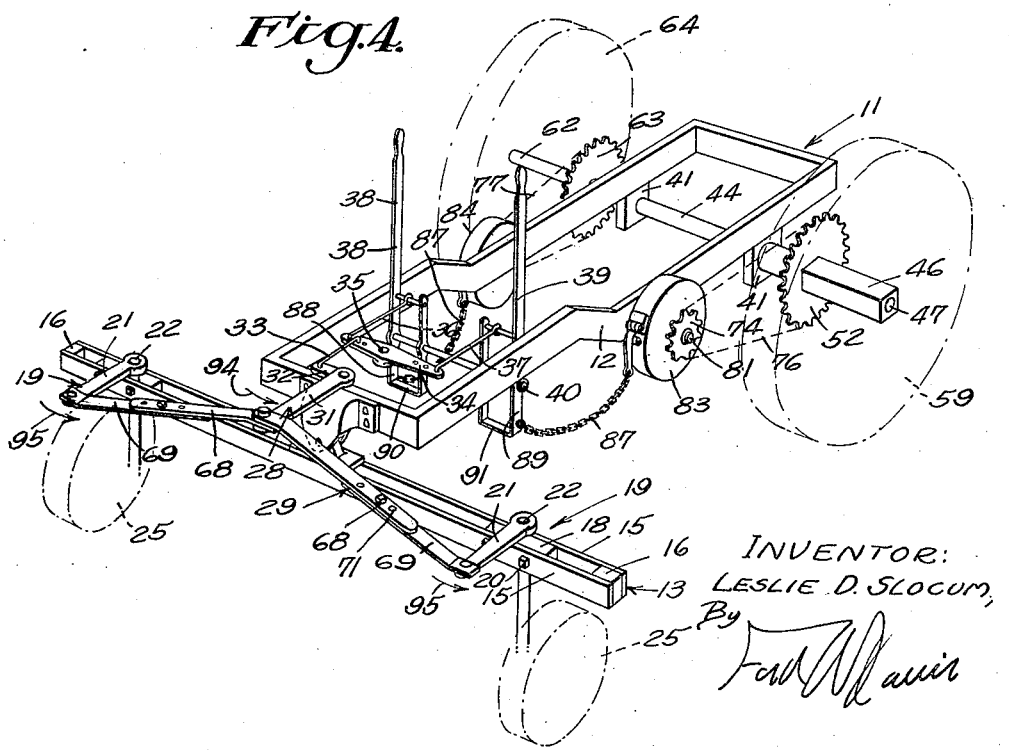
Fig. 4 is a diagrammatic perspective view for illustrating the principal features of the invention.

As will be perceived from Fig. 4, the new steering apparatus which my invention provides operates in the following manner: A driver seated in the driver's seat 92 engages the handles 38 and 39 respectively with his right and left hands and places his right and left feet in the respective stirrups 90 and 91. In steering the vehicle a pull on the left-hand lever 39 and a forward thrust on its associated stirrup 91 will result in pulling rearwardly on the link 37 so as to rotate the cross bar 34 in anti-clockwise direction, with the result that a forward thrust is exerted on the link 33 which causes a rotation of the crank 31 in the direction of the arrow 94 and through the links 29 swings the levers 21 of the steering knuckle 19 in the direction of the arrows 95, so that the front wheels 25 will be swung in leftward direction so as to cause them to turn to the left.

In a like manner, a pull on the rightward lever 38 and a thrust on its associated stirrup 90 will result in a movement of the steering mechanism in such a manner as to turn the vehicle in rightward direction.

The chains 87 which extend from the lower ends of the steering levers 38 and 39 to the brake mechanisms 84 and 83 are given a sufficient amount of slack or excess length to permit a limited movement of the steering levers 38 and 39 without actuating the brake mechanisms 84 and 83. In the ordinary steering of the vehicle down the rows of plants which are being cultivated, only a relatively small movement of the steering levers 38 and 39 is required, but should a sharp turn be desired and either the lever 38 or the lever 39 pulled back far enough to actuate either the brake mechanism 84 or the brake mechanism 83, the retarding action of whichever brake is applied will tend to hold the associated rear wheel stationary, whereupon the engine 72 will operate through the differential to drive the opposite rear wheel at higher speed. The effect of applying a retarding action to one of the rear wheels is to cause an excess application of power to the other rear wheel, thus causing one of the drive wheels to roll faster than the other, with the result of causing the vehicle to pivot on the drive wheel which is retarded.

Should it be desired to turn sharply to the left, the driver will pull back hard on the lever 39, at the same time thrusting forwardly with his left foot on the stirrup 91. This will result in swinging the front wheels 25 sharply to the left and causing the actuation of the brake mechanism 83 so that there will be a tendency to retard or fully stop the rotation of the shaft 81 and likewise the sprockets 74 and 52 associated therewith. By reason of the resulting tendency to hold the leftward drive wheel 59 stationary, a pivoting action on the leftward rear wheel 59 is caused, which supports or reinforces the guiding action of the front wheels 25 which have been turned in leftward direction, so that the vehicle will turn sharply without the front wheels sliding or skidding forwardly.

When it is desired to turn sharply to the right, the rightward lever 38 is pulled back a sufficient distance to actuate the rightward brake mechanism 84 which will result in a rightward pivoting action on the rear wheel 64.

A driver seated in the driver's seat 92 has convenient access to all of the control mechanisms of the vehicle. If the transmission 78 provides a variety of speed changes, the gear shift lever, as indicated at 96, Fig. 1, may be bent forwardly for easy operation.

When seated in the position indicated, the driver has full view of tools 97 which are held by a tool carrier or tool frame 98 situated in proximity to the front wheels of the vehicle and preferably in position a little to the rear of the front wheels 25. Various types of tools may be employed, but in the present illustration I have indicated such tools in the form of cultivators which are held in place on lateral bars 100 of the tool carrier 98 by any desired clamping means, such as indicated by bolts 101. The cultivating tools 97 are adapted to be varied in their spacing in accordance with the spacing of the rows of plants which are to be cultivated. The driver seated above and slightly to the rear of the tools can keep close check thereon and may cause the tools to closely follow a desired path by swinging the forward end of the vehicle to the right or to the left, which is accomplished by the steering mechanism hereinbefore described.

The tool carrier 98 has a pair of forwardly extending end bars 105 which swing vertically on pivots 106 situated at the ends of a front cross bar 107 forming part of the secondary frame member 13, which member 107 is secured to the bars 15 by forwardly and downwardly curved members 108. The tool frame 98 may be raised or lowered by means of rods 109 and 110 which respectively extend upwardly to levers 111 and 112.

The lower ends of the rods 109 and 110 are downwardly slidable through holes provided in the frame 98, there being a head 113 on the lower end of each rod 109 and 110 which will engage and lift the frame 98 when the rods 109 and 110 are lifted by the levers 111 and 112. The frame 98 is ordinarily held in engagement with the heads 113 by springs 115 which are placed on the rods 109 and 110 above the frame 98 and are retained by collars 116 which are located on the rods 109 and 110. The adjustment lever 111, as shown in Fig. 3, is secured to a horizontal laterally extending shaft 118 so that the swinging of the lever 111 causes a rotation of the shaft 118. On the rightward end of the shaft 118 a notched segmental frame 120, as shown in Fig. 8, is secured so as to rotate with the shaft 118. Adjacent to the segment 120 the rightward adjustment lever 112 is rotatably mounted on the shaft 118 but is caused to normally rotate with the shaft 118 as a result of the engagement of a latch mechanism 121 with notches 122 of the segment 120. By swinging the lever 111, both rods 109 and 110 are moved, owing to the fact that the lever 112 must swing with the shaft 118.

A notched adjustment segment 123 is provided for engagement of latch mechanism 124 with which the lever 111 is equipped, therefore making it possible for the operator to easily set the tools at any desired height either in ground working engagement or in free position thereabove.

The lever 112, by use of the notched segment 120 and the latch mechanism 121 may be changed in position relative to the lever 111 so as to raise or lower the rightward end of the tool carrier 98 relative to the leftward end thereof, and thus to bring the tool carrier to a desired level of operation.

In this disclosure I have shown in simple manner a practical and operative embodiment of my invention, but I am aware that various parts, elements, or mechanisms thereof are representative of other parts, elements, or mechanisms which may be employed in substantially the same manner to accomplish substantially the same results; therefore it is to be understood that my invention is not to be limited to the details disclosed but shall have the scope of the following claims.

I claim as my invention:

1. A farm implement of the character described, including: a frame; front wheels for said frame; steering knuckles holding said front wheels in operative position on said frame; a pair of rear wheels for said frame; a motor carried by said frame; a transmission for driving said rear wheels from said motor; a driver's seat; steering means cooperative with said steering knuckles for steering said front wheels, said steering means comprising a pair of vertically disposed hand levers swingable in a longitudinal plane in front of said driver's seat, and a pair of longitudinally movable foot pedals operatively connected to said hand levers; a brake for each of said rear wheels; and means, acting in consequence of the manipulation of said steering means to swing said front wheels, for applying the brake associated with the rear wheel on the side of the implement in the direction said front wheels are swung.

2. A farm implement of the character described, including: a frame; front wheels for said frame; steering knuckles holding said front wheels in operative position on said frame; a pair of rear wheels for said frame; tools held by said frame in position at the forward end of said frame; a driver's seat on said frame in position enabling view of said tools by the driver; a motor carried by said frame; a transmission for driving said rear wheels from said motor; steering means cooperative with said steering knuckles for steering said front wheels, said steering means comprising a pair of longitudinally hand-actuated members and a pair of longitudinally foot-actuated members, and means connecting said members to said steering knuckles in a manner to swing said steering knuckles; a brake for each of said rear wheels; and means, acting in consequence of the manipulation of said steering means to swing said front wheels for applying the brake associated with the rear wheel on the side of the implement in the direction said front wheels are swung.

3. A farm implement of the character described, including: a frame; wheels mounted on said frame for the support thereof; a driver's seat on said frame; and steering means for said implement, said steering means comprising right and left vertically disposed lever members pivoted intermediate their ends so as to swing in vertical longitudinal planes, the upper ends of said members being prepared for manual engagement and the lower ends of said members being prepared for foot engagement, and means operatively connecting said members to a selected number of said wheels so as to produce a required steering movement thereof.

4. A farm implement of the character described, including: a frame; wheels mounted on said frame for the support thereof; a driver's seat on said frame; and steering means for said implement, said steering means comprising right and left vertically disposed lever members pivoted intermediate their ends so as to swing in vertical longitudinal planes, the upper ends of said members being prepared for manual engagement and the lower end of said members being prepared for foot engagement, interconnecting means connecting said members together so that said left-hand member will swing rearwardly when said right-hand member swings forwardly, and means operatively connecting said members to a selected number of said wheels so as to produce a required steering movement thereof.

In testimony whereof, I have hereunto set my hand at Oxnard, California, this 8th day of July, 1929.

LESLIE D. SLOCUM.